United States Patent [19]

Shay et al.

[11] 4,318,551
[45] Mar. 9, 1982

[54] VEHICLE FRONT SUSPENSION SYSTEM SUPPORT

[75] Inventors: Harry Shay, Novi; Daniel Sanders, Lansing; Nelson R. Turner, Battle Creek; Charles Bienenstein, Bloomfield, all of Mich.

[73] Assignee: The Model A and Model T Motor Car Reproduction Corp., Wixam, Mich.

[21] Appl. No.: 80,000

[22] Filed: Sep. 28, 1979

[51] Int. Cl.³ .............................................. B62D 21/00
[52] U.S. Cl. ................................... 280/788; 280/696; 280/701; 296/204
[58] Field of Search ................ 280/696, 701, 724–726, 280/788; 267/60; 296/204

[56] References Cited

U.S. PATENT DOCUMENTS

| Re. 23,147 | 9/1949 | Börjeson | 280/96.2 |
|---|---|---|---|
| 2,554,261 | 5/1951 | Munger | 180/79.2 |
| 2,580,559 | 1/1952 | Kolbe | 280/788 |
| 2,581,030 | 1/1952 | Kolbe | 280/87 |
| 2,606,021 | 8/1952 | Hexel | 280/696 |
| 2,997,313 | 8/1961 | Wall | 296/204 |
| 3,178,202 | 4/1965 | Kozicki | 280/696 |
| 3,512,800 | 5/1970 | Van Winsen | 280/788 |
| 3,940,161 | 2/1976 | Allison | 280/96.2 R |

Primary Examiner—Richard A. Bertsch
Assistant Examiner—John A. Carroll
Attorney, Agent, or Firm—Hiram P. Settle

[57] ABSTRACT

A support for a front suspension system in vehicles is disclosed. The front suspension system support of the present invention creates an opening between side members of a frame of the vehicle which is longitudinally between the transverse axis of the vehicle front wheels. The opening is utilized to place a radiator between the front wheels of the vehicle with the radiator supported between the frame longitudinal members.

4 Claims, 9 Drawing Figures

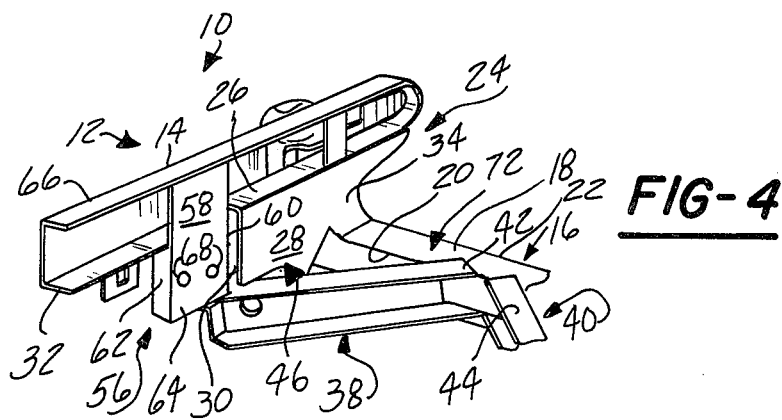
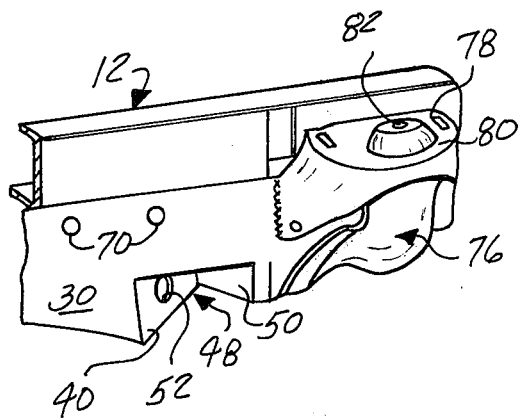
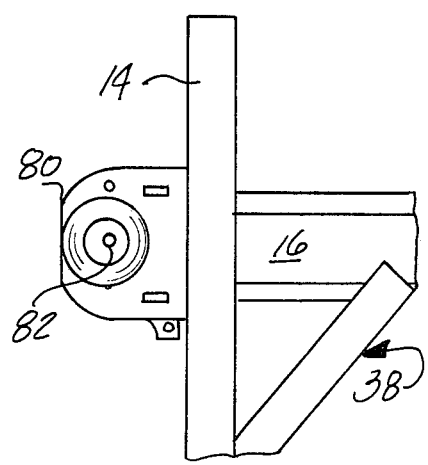

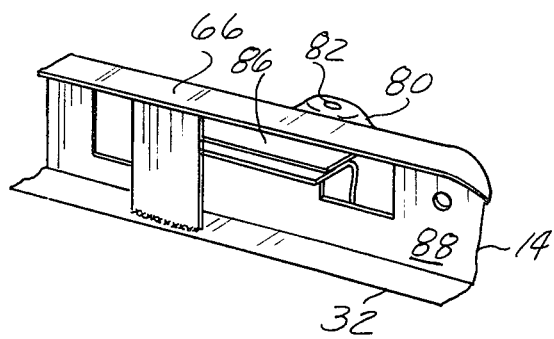
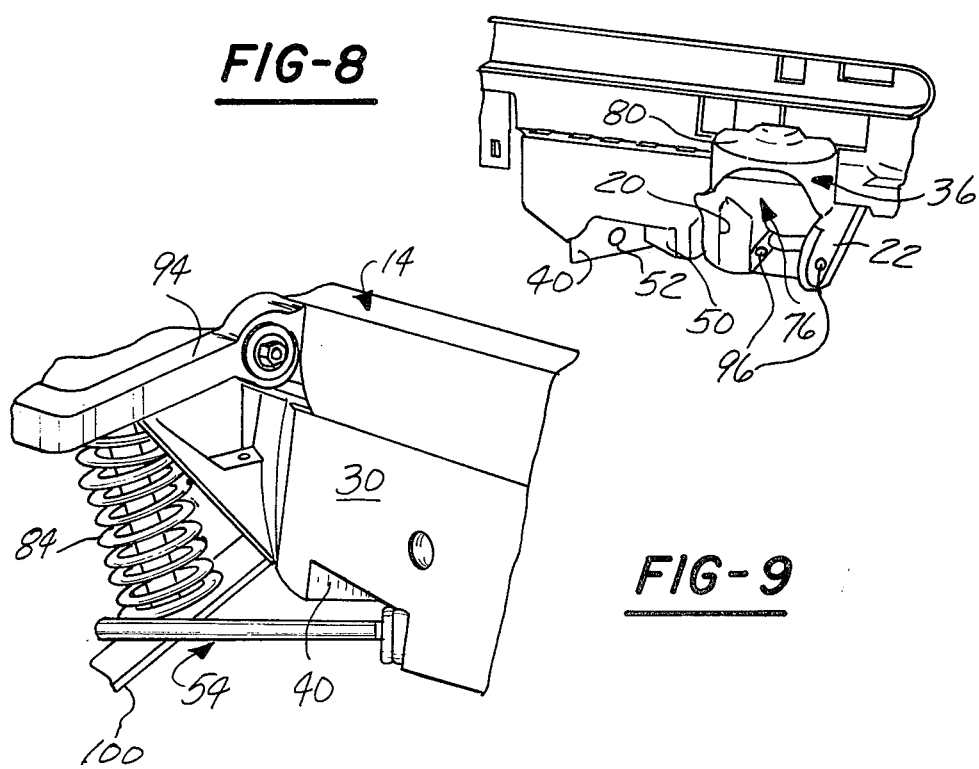

VEHICLE FRONT SUSPENSION SYSTEM SUPPORT

BACKGROUND OF THE INVENTION

I. Field of the Invention

The present invention relates to the field of vehicle frames. More specifically the present invention relates to the field of vehicle frames which provide support for a front suspension. Even more specifically the present invention relates to the field of vehicle frames providing space between longitudinal frame members the space aligned with a transverse axis of the front wheels.

II. Prior Art Statement

Vehicle frames which provide support for a front end suspension system are known.

U.S. Pat. No. RE23147 discloses a vehicle frame for supporting a front end suspension system. This United States Patent does not disclose the transverse member of the present invention which is spaced below the vehicle frame.

U.S. Pat. No. 2,554,261 discloses a vehicle frame which provides a support for a front end suspension system. This United States Patent does not disclose the transverse member of the present invention aligned with the front wheels and extending therebetween and spaced below the frame of the vehicle.

U.S. Pat. No. 2,580,559 discloses a vehicle frame with a support for a vehicle front end suspension system. This United States Patent does disclose a transverse support member, but the support member is not aligned between the vehicle wheels and is not spaced below the vehicle frame as in the present invention.

U.S. Pat. No. 2,581,030 discloses a vehicle frame which provides support for a front end suspension system. This United States Patent discloses a transverse member extending between a pair of spaced apart longitudinal frame members and aligned between the vehicle wheels as in the present invention. A central portion of the transverse member is positioned below the frame for a short distance. The transverse member extends upward and outward within the space inside of the longitudinal members to meet the longitudinal members. The open space extending between the longitudinal members aligned with the wheels of the present invention is not present in this United States Patent. This United States patent does not disclose the bracket of the present invention for supporting the transverse member.

U.S. Pat. No. 3,940,161 discloses a frame support for independent wheel suspension for a motor vehicle. This United States Patent does not disclose the transverse member of the present invention.

The above listed United States Patents constitute the closest prior art known to the Applicant and his Attorney.

SUMMARY OF THE INVENTION

It is an object of the present invention to provide a frame for motor vehicles with support for a front end suspension system.

It is also an object of the present invention to provide a frame for motor vehicles with support for a front end suspension with open space between frame longitudinal members between front wheels, the opening extending below the frame.

It is a further object of the present invention to provide a transverse member extending between frame longitudinal members in line with the front wheels, the transverse member positioned below the frame.

It is an additional object of the present invention to provide frame supported engine mounts which attach to the engine at a point below the vehicle frame.

It is an additional object of the present invention to provide a vehicle frame with support for a front end suspension system which provides an open space between frame longitudinal members between front wheels, the space extending below the vehicle frame, with a transverse member extending transversely between the vehicle front wheels, the transverse member positioned below the vehicle frame so that a vehicle radiator may be positioned on a line extending between the center of the front wheels with a lower portion of the radiator positioned below the line extending between the center of the front wheels.

The vehicle front end suspension system support of the present invention comprises a frame including a pair of spaced apart longitudinal members and a transverse member including a top wall aligned below the transverse axis of the front wheels extending between the longitudinal members. The top wall of the transverse member extends transversely in a straight line below inner edges of the frame then curves arcuately upward and outward beginning at the inner edges terminating proximate a frame outer edge.

The front end suspension system support of the present invention further comprises a bracket including a top wall which abuts each longitudinal member having an inside wall and an outside wall integral with the top wall. The inside wall and outside walls extend downward to meet the transverse member and are affixed thereto by welding or other suitable means to support the transverse member.

The front end suspension system support further includes a pair of opposed angle braces attached at a forward end to the center of the transverse member. The opposed angle braces extend rearward and outward in an opposed manner to a point spaced below the frame where the rearward ends of the braces abut and are affixed to the outside wall. A notch is formed in a lower portion of each inside wall which allows the braces to pass therethrough, and the edges of the notch are welded to the braces. An outside recess is formed in the outside wall to expose the rearward end, the recess extending forward a distance. An angle wall extends rearward and inward from a forward edge of the recess to abut and support the brace. A stabilizer bar aperture is formed in a vertical wall of the braces spaced in a distance from the outside wall. The stabilizer bar apertures are configured to support an end of a stabilizer bar which extends forward and outward to support an outer end of a lower arm of the front end suspension system.

The engine support of the present invention comprises a pair of opposed engine mount brackets including an inner wall, a forward wall, a rearward wall, and a bottom wall cojoined to form a box like structure. The inner wall abuts the inside edge of the longitudinal members extending downward to the brace. The forward wall extends from the frame lower flange downward to the brace integral with the inner wall, and outward to the bracket outside wall. The rearward wall is integral with the inner wall extending outward to the outside wall, and the bottom wall is joined to a bottom edge of the inner wall and extends outward to the outside wall to be attached thereto. A pair of engine mount apertures are formed in each inner wall, and a pair of access apertures are formed in the outside wall aligned with the engine mount apertures.

For a more complete understanding of the present invention, reference is made to the following detailed description and accompanying drawings.

Other objects, advantages, and applications of the present invention will become apparent to those skilled in the field to which this invention pertains, when the accompanying description of the best modes contemplated for practicing the invention are read in conjunction with the accompanying drawings.

BRIEF DESCRIPTION OF THE DRAWINGS

In the drawings, like reference numbers refer to like parts throughout the several views, and wherein:

FIG. 4 illustrates a broken perspective view of the front end of the frame and suspension support system viewed from inside the frame looking forward and to the left;

FIG. 5 illustrates a broken perspective view of the front end support of the present invention as viewed from outside the frame from the right hand side of the vehicle looking forward and toward the vehicle.

FIG. 6 illustrates a broken perspective view of a forward portion of the front end suspension as viewed from inside the frame looking to the left of the vehicle and rearward;

FIG. 7 illustrates a broken view of the left side of the front end support as viewed from the top of the frame;

FIG. 8 illustrates a broken perspective view of the right side of the front end suspension support as viewed from the right side of the vehicle looking to the right and rearward; and FIG. 9 illustrates a broken perspective view of the left side of the front end suspension system as viewed from outside the frame looking forward and toward the center of the vehicle.

DESCRIPTION OF THE PREFERRED EMBODIMENT

Figure 1:
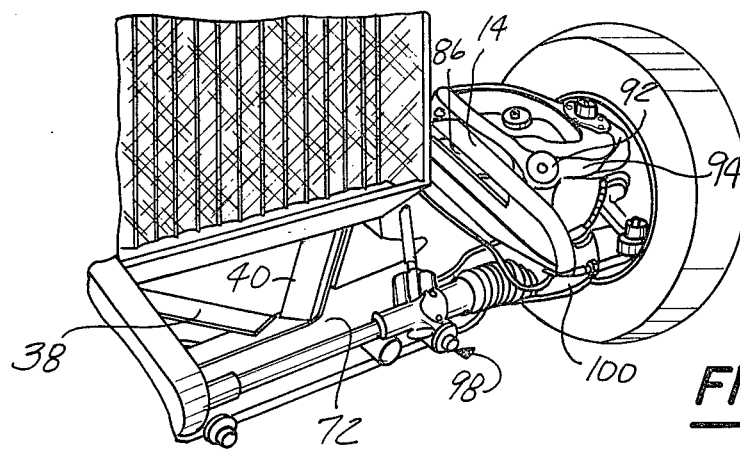
FIG. 1 illustrates a broken perspective view of a frame of the present invention with a radiator core mounted thereto.

The present invention which will be described subsequently in more detail comprises a front end and engine support which allows the mounting of a radiator core 102 to the vehicle frame in a space between front wheels 104,106 of the vehicle and extending below and aligned with a line extending between the center of the front wheels. The radiator 102 must be positioned in this manner in order to arcuately produce a replica of the Ford Model A vehicle 108.

Referring now to the drawings and in particular FIG. 4 wherein there is illustrated at 10 a broken perspective view of a preferred embodiment of a support for a front suspension system and engine of the present invention. The front end and engine support of the present invention comprises a frame 12 including a pair of spaced apart longitudinal members 14. A transverse member 16 includes a top wall 18 which is aligned below a transverse axis extending between a center of the opposed front wheels of the vehicle. The transverse member 16 is spaced below the longitudinal members 14 with the top wall 18 extending transversely in a straight line to a point below inner edges of the longitudinal member 14, then curving arcuately upward at the inner edges ending proximate a frame outer edge. The transverse member 16 includes a downward extending rear wall 20 and a downward extending front wall 22, the walls 20,22 are integral with the top wall 18 to provide structural strength for the transverse member. The transverse member 16 is attached to the longitudinal member 14 by a pair of opposed brackets 24 which will be described in more detail subsequently.

The bracket 24 comprises a top wall 26, a downward extending inside wall 28 integral with the top wall 26 and a downward extending outside wall 30 integral with the top wall 26. The bracket top wall 26 abuts and is attached to a lower flange 32 of the frame. A portion of the inside wall 34 abuts the transverse member top wall 18 and is attached thereto to support the transverse member 16. An opening 36 is formed in the outside wall (FIG. 8) with the edges of the opening 36 abutting the walls 18,20, and 22 of the transverse member and attached thereto by welding giving further support to the transverse member 16.

The front end suspension and engine support of the present invention further comprises a pair of opposed angle braces 38,40 (FIG. 4) having a forward end 42,44 attached proximate a center of the transverse member 16. The pair of opposed angle braces 38,40 extend rearward and outward in an opposed manner to a point spaced below the frame with a rearward end of the braces abutting and affixed to the outside wall 30. An inside notch 46 formed in a lower portion of the inside wall 28 allows the braces 38,40 to pass therethrough. The edges of the notches 46 abut the braces and are attached thereto by welding to to support the rearward end of the braces. An outside recess 48 formed in the outside wall extends forward a distance from a forward wall of the brace (FIG. 5). An angle wall 50 extends rearward and inward from a forward edge of the recess 48 to abut and attach to the braces 38,40. A stabilizer bar aperture 52 is formed in a vertical wall of the braces spaced in a distance from the outside wall, with the aperture configured to support an end of a stabilizer bar 54 (FIG. 9) which supports a lower arm of the front suspension system.

A preferred embodiment of the present invention further includes a pair of opposed engine mount brackets 56 including an inner wall 58, a forward wall 60, a rearward wall 62 and a bottom wall 64 cojoined into a box like structure (FIG. 4). The inner wall 58 of each engine mount abuts an inside edge of an upper flange 66 and an inside edge of the lower flange 32 and extends downward to the braces 38,40. The forward wall 60 extends downward from the lower flange 32 to the braces 38,40 integral with the inner wall 58 and extends transversely outward to the bracket outside wall 30. The rearward wall 62 is integral with the inner wall and extends outward to the outside wall 30. The bottom wall 64 is joined to a bottom edge of the inner wall 58 and extends outward to the outside wall 30 where it is attached thereto. A pair of engine mount apertures 68 are formed in each inner wall 58, and a pair of access apertures 70 are formed in each outside wall 30 aligned with the engine mount apertures 68 to secure the engine to the engine mount.

Figure 2:
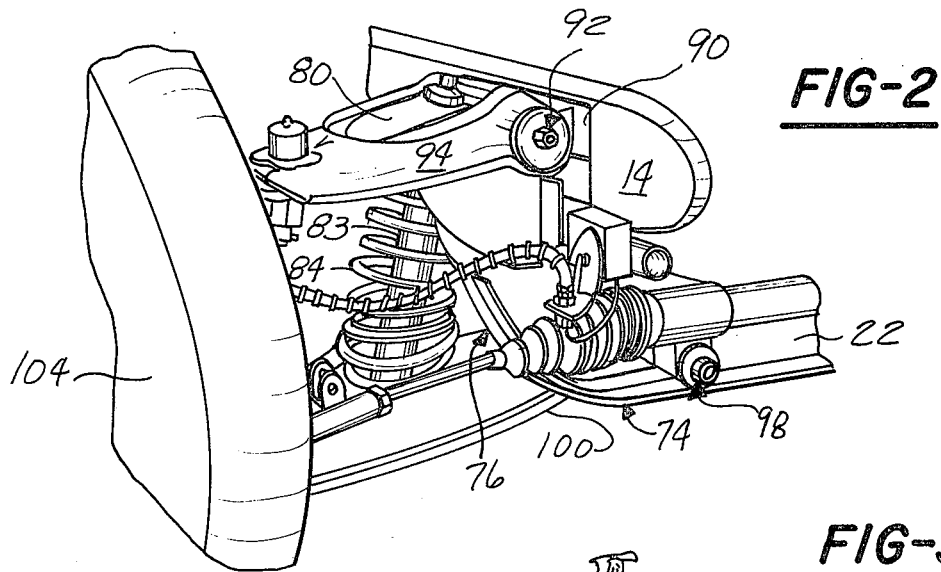
FIG. 2 illustrates a broken perspective view of the front end suspension system of the present invention.
Figure 3:
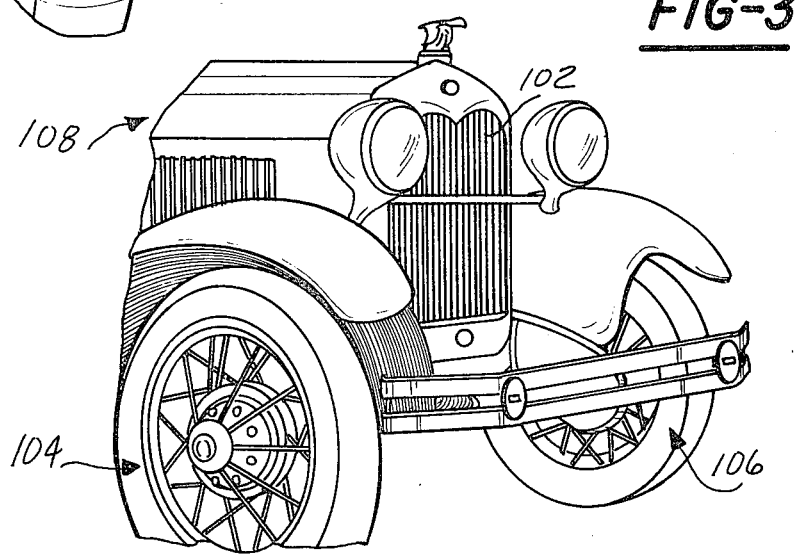
FIG. 3 illustrates a broken perspective view of the front end of a Ford Model A replica employing the support system of the present invention.

The transverse member 16 includes a linear central portion 72 extending between the spaced apart longitudinal members 12 then curving upward and outward where it meets the longitudinal member to form a pair of opposed upward curving ends 74 (FIG. 2). The rear and front walls 20,22 curve upward and outward to form a spring enclosure 76 terminating outward of the longitudinal members 12 (FIG. 5). Still referring to FIG. 5 a spring support 78 snugly engages the front and rear walls and is welded thereto. A top wall 80 of the spring support 78 supports an end of a spring 84 (FIG. 2). An aperture 82 formed in the top walls supports an upper end of a shock absorber 83. An inward projection 86 of the wall 80 abuts an edge of an opening formed in a vertical outside flange 88 of the longitudinal member 14 and is affixed thereto.

An upper arm support 90 snugly engages and is attached to the spring support 78 by welding or other suitable means. A pair of opposed upper arm pivots 92 project from the upper arm support longitudinally to support an upper arm 94. A pair of longitudinally aligned apertures formed in the front and rear walls 22,20 respectively support a pair of lower arm pivots 98 which support a lower arm 100.

There has been described hereinabove a support for a vehicle front end suspension system which provides the use of an individual front wheel suspension system but provides space between longitudinal frame members between the front wheels of the vehicle for the installation of a radiator. This positioning of the radiator allows the creation of a replica of the Ford Model A vehicle but with individual front wheel suspension and disc brakes. While the description as related hereinabove refers to the Ford Model A vehicle, the use of this invention is not restricted solely to that vehicle. Other vehicles sold prior to or subsequent to the Ford Model A may also be duplicated using the teachings of the present invention.

Having thus described my invention what I claim is:

1. A vehicle front wheel support assembly for supporting the front wheels of a replica vehicle, comprising a pair of longitudinally extending frame side rails, a transverse frame member vertically aligned with the axes of said vehicular front wheels, said frame member having a central horizontal portion extending between said rails at a lever beneath the axes of the front wheels and beneath the level of said rails, said frame member having an end portion extending upwardly beneath each of the adjacent side rails to be secured thereto and to terminate outside the adjacent side rail with the upper extremity of said end portion lying beneath the upper edge of said side rail, an upper wheel pivot arm pivotally carried by each of said rails on the outside thereof generally above the adjacent terminal end of the transverse frame member and beneath the level of the upper edge of the adjacent side rail, a lower wheel pivot arm pivotally carried by each of those end portions of the transverse frame member which lie outside the adjacent side rail and beneath the adjacent upper pivot arm, and a shock absorber interposed between said lower arm and the upper extremity of said end portion, so that the entire front wheel support assembly lies beneath the level of the upper edges of the side rails.

2. In an assembly as defined in claim 1, a radiator supported on the horizontal portion of said transverse member to extend transversely between said side frame rails.

3. In an assembly as defined in claim 1, a depending support bracket mounted on each side rail and projecting rearwardly from the end of said transverse frame member secured thereto, and a pair of rearwardly divergent braces having their respective front ends secured to the horizontal portion of said transverse member and their respective rear ends connected to said support brackets.

4. In an assembly as defined in claim 2, a stabilizer bar connected to each of the lower wheel pivot arms and projecting rearwardly therefrom for connection to the adjacent brace.

* * * * *